March 29, 1955
L. D. PFAU
2,705,159
HOSE COUPLING
Filed June 23, 1949
2 Sheets-Sheet 1
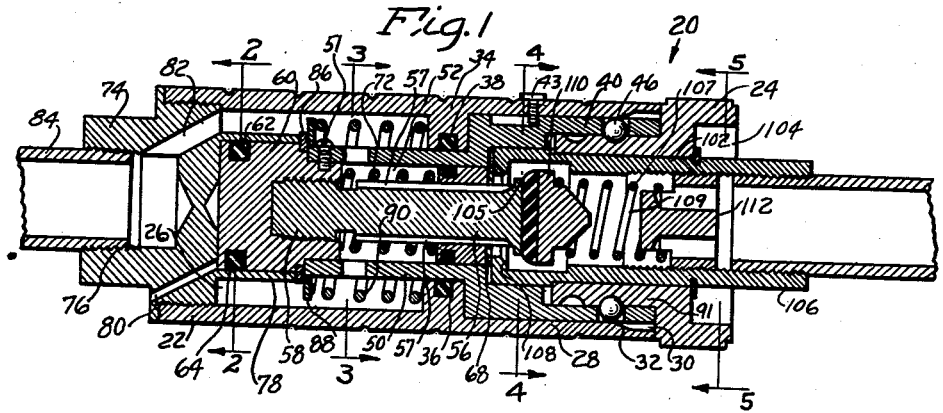
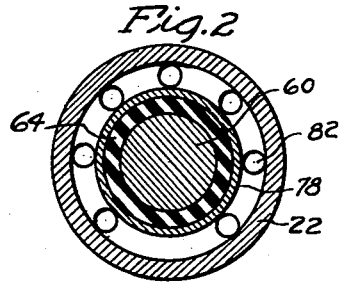
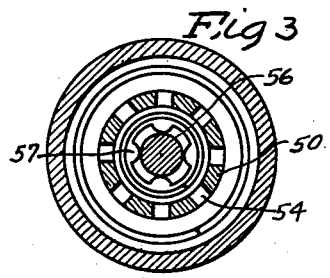
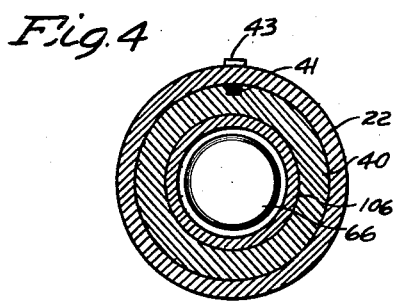
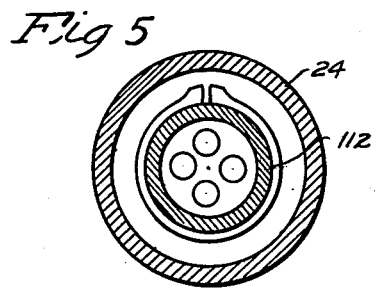
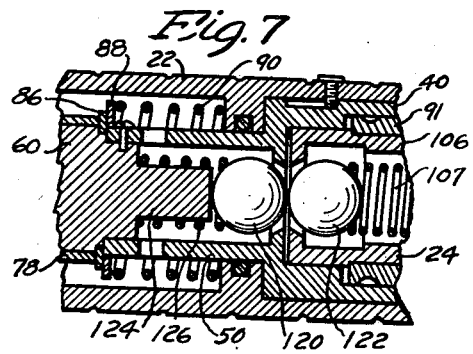
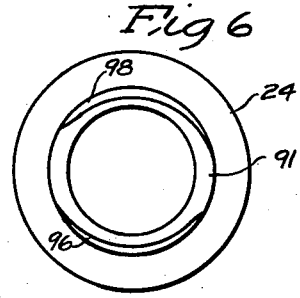
INVENTOR.
LEO D. PFAU
BY
John L. Woodward
Attorney March 29, 1955  L. D. PFAU  2,705,159
HOSE COUPLING Filed June 23, 1949  2 Sheets-Sheet 2

INVENTOR.
LEO D. PFAU
BY John L. Woodward
Attorney

United States Patent Office 2,705,159
Patented Mar. 29, 1955

2,705,159

HOSE COUPLING

Leo D. Pfau, Minneapolis, Minn.

Application June 23, 1949, Serial No. 100,861

2 Claims. (Cl. 285—150)

This invention relates to a hose coupling wherein closure valves are provided in both coupling members, the valves being held open when the coupling is closed and being closed when the parts are uncoupled.

Heretofore the tube couplings have had the disadvantage of being unable to automatically uncouple if the hose or tube in which the coupling is used should be subjected to unusual stresses and/or strains and also it was very difficult to recouple the prior couplings due to high pressure in the line. I have devised means whereby the coupling members are easily connected together and are securely locked or held together during a predetermined stress or strain to which the hose would be subjected during use but the means associated with the two coupling members permits the two members to be separated under a stress above said predetermined stress.

The coupler of this invention is designed primarily for use with hydraulic equipped implements such as plows, listers, etc. where at times the implement may become uncoupled from the tractor while in operation.

The coupler is a safety means and the coupler by pulling apart at a stress above a predetermined stress (normal working conditions) prevents the hose connection connecting the supply tank with the operated mechanism from breaking. There is usually a high pressure of hydraulic fluid in the hose line if the coupling is pulled apart during operation of the machine and such pressure becomes trapped when the coupling is pulled apart during operation of the machine. In order to easily recouple the line under pressure I have provided one of the members of the coupling with spiral groove screw means while the other member is provided with ball bearing means. The spiral groove on one of the members of the coupling engages the ball bearings on the other member of the coupling when the member having the spiral screw means is turned in a circular movement thus screwing the coupler together and the coupler can be coupled together at one thousand pounds pressure thus making bleeding of the hose line unnecessary. When the helical screw means and ball bearing means are used in uniting the two coupling members together, the pressure in the line is easily overcome. A two lead helix means or screw is used thus the travel of the unit is twice as fast so that a one half revolution of the member carrying the helix means will fully couple the coupling members together.

It is an object of my invention to provide a tube coupling having means associated with the two members to permit a secure locking of the two members together and the two parts to remain secured together until a predetermined stress is exceeded and other means associated with one of the members permitting the two members to be separated when a stress above the predetermined stress is applied to the said member or members of the coupling.

It is another object of the invention to provide a coupling having two separate members, a slidable sleeve means having bearing means coacting with a first bore of one of the members under a predetermined stress, the second member provided with spiral groove means for interlocking with the bearing means of the sleeve under the said predetermined stress, but the second member moving the sleeve under a strain in excess of the predetermined strain until the bearing means coacts with a second bore in the first member thereby releasing the groove means of the second member from the bearing means permitting separation of the two members of the coupling.

It is another object of this invention to provide a tube coupling having two separable members both having valve means which are in open position when the coupling is closed and being closed when the parts are uncoupled. The first member provided with a slidable means having ball bearing means coacting with a first bore of a predetermined diameter under a predetermined stress, the second member provided with a pair of spiral grooves having spaced apart leads interlocking with bearing means of the sleeve under the said predetermined stress, but the second member moving the sleeve under a stress in excess of the predetermined stress until the bearing means coacts with a second bore in the first member thereby releasing the groove means of the second member from the bearing means permitting separation of the two members of the coupling.

Further features of the invention will be evident from the following description in connection with the preferred embodiments of the invention taken in connection with the accompanying drawings in which:

Figure 1 is a vertical cross-sectional view of the coupling assembled.

Figure 2 is a sectional view taken on line 2—2 of Figure 1, looking in the direction of the arrows.

Figure 3 is a sectional view taken on line 3—3 of Figure 1, looking in the direction of the arrows.

Figure 4 is a sectional view taken on line 4—4 of Figure 1, looking in the direction of the arrows.

Figure 5 is a sectional view taken on line 5—5 of Figure 1, looking in the direction of the arrows.

Figure 6 is an end view of the right hand member of the coupling shown in Figure 1 of the drawings.

Figure 7 is a vertical cross-sectional view of a modified coupling assembled.

Figure 8:
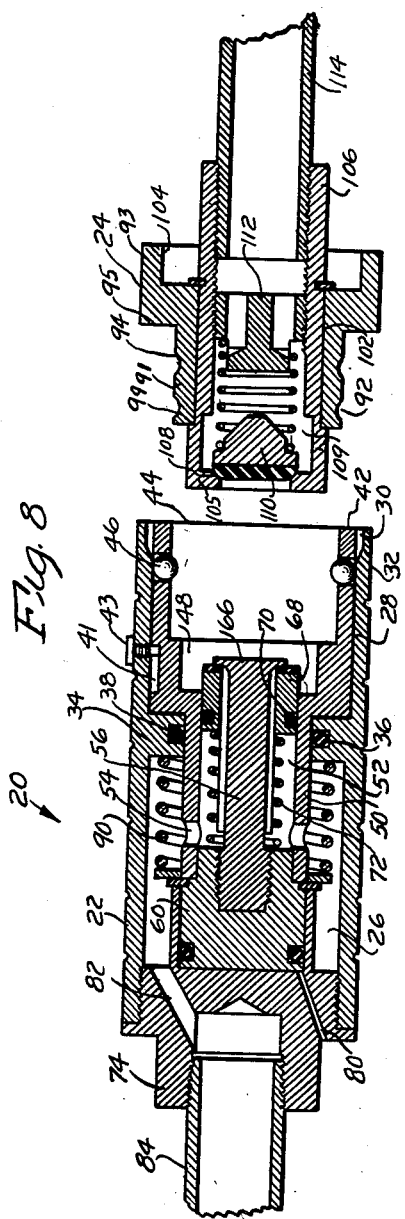
Figure 8 is a cross-sectional view of the coupling, with the coupling members separated.

Referring in detail to the drawing, 20 is a coupling which comprises two hollow bodies or members 22 and 24 which are capable of being coupled together and also uncoupled.

The body 22 is provided with an axial bore 26 in its rear portion, a second bore 28 of larger diameter than bore 26 in its front part and a third bore 30, greater in diameter bore 28 at its front end with a circumferential tapered surface 32 connecting bore 28 with bore 30. An internal circumferential flange 34 is provided with a groove 36 for an O-ring 38.

A sleeve 40 is mounted inside the hollow member 22 and is provided with an outer part 42 having an internal bore 44 of a predetermined diameter. The outer part 42 has two apertures 180 degrees apart each of which carries a small ball bearing 46. A slot 41 in the outer surface of sleeve part 42 cooperates with a screw 43 in body 22 to limit longitudinal movement of the sleeve 40 and also to prevent rotational movement thereof in the body 22. A second bore 48 of smaller diameter than bore 44 is spaced immediately behind bore 44 in the sleeve 40. A rearwardly extending cylindrical portion 50 of smaller diameter than the part 42 is provided with a bore 52 having a diameter which is smaller than bore 48. The cylindrical portion 50 has a plurality of spaced apertures 54 for communicating bore 26 with bore 52 in the cylinder 50. A stem 56 of smaller diameter than bore 52 extends through the bore 52 of the cylinder portion 50 of sleeve 40. The rear portion 58 of stem 56 is screw threaded to a cylindrical block 60. Block 60 is provided with a circumferential groove 62 in its outer surface adjacent its rear end with an O-ring 64 carried therein. A screw 51 fastens the rear end of sleeve 40 to block 60. The stem 56 is provided with a head 66 which extends into the bore 48 intermediate the ends of the sleeve 40, see Figure 8 of the drawings. A plurality of longitudinal grooves 57 are spaced around the outer surface of the stem 56. An annular ring 68 provided with an oil ring 70 carried in a groove at its rear end thereof is slidably mounted on the stem 56 with a coiled spring 72 carried on the rear of the stem 56 between the inner end of plug 60 and rear side of the annular ring 68, urging the annular ring 68 to seat against the rear of the head 66, see Figure 8 of the drawings.

A plug 74 provided with a screw threaded opening 76 in its outer end is screw threaded to the outer end of the coupling body 22. A cylindrical socket 78 of smaller diameter than bore 26 extends into the bore 26 in the rear of the body 22. The cylindrical block 60 is slidably mounted in the socket 78. An air duct 80 communicates the rear of the socket 78 with atmospheric pressure. A plurality of circumferentially spaced apertures 82 in plug 74 communicates opening 76 with bore 26 in the rear of member 22. A tube or hose 84 is screw threaded in the opening 76 in the rear of plug 74.

A stop ring 86 is mounted adjacent the front of the plug 60 with a circumferential washer 88 carried on the rear end of the sleeve portion 50 abutting the stop ring 86. A coil spring 90 is mounted on the sleeve portion 50 between the washer 88 and rear side of the flange 34 urging the sleeve 40 rearwardly in the body 22 and under a predetermined strain maintaining the ball bearings 46 in engagement with the surface of bore 28.

The hollow body member 24 is provided with a reduced sleeve 91 at its inner end provided with a pair of helical grooves 92 and 94 having leads 96 and 98 respectively which are 180 degrees apart. The helical grooves 92 and 94 are each provided with a relatively flat pitch throughout their entire lengths. Each helical groove 92 and 94 is provided with a straight portion 100 at their inner ends which provides an offset or socket with respect to the spiral groove portion 92 or 94. The offset or straight portion 100 of the grooves 92 and 94 locks the ball bearings 46 of sleeve 40 in the reduced portion 91 of the body 24 when the two members 22 and 24 are in coupled position. The body 24 is also provided with a collar portion 93 at its rear end with a shoulder 95 spaced between the collar 93 and reduced inner end 91. The body 24 is provided with a bore 102 at its inner end and a bore 104 of greater diameter than bore 102 at its rear end. A cylindrical sleeve 106 provided with a valve seat 108 formed on the inside of a circumferential flange 105 at its inner end is mounted in bore 102 of member 24. A movable valve 110 is urged to closed position on seat 108 by a coiled spring 107 spaced in bore 109 of sleeve 106 between the rear side of the valve 110 and a spacer 112 screw threaded in the rear of bore 109 of sleeve 106. Sleeve 106 is mounted in the bore 102 of body 24 with a portion extending beyond the front of the reduced portion 91 while the rear end of the sleeve extends through bore 104 at the rear of the body 24. The front portion of the reduced portion 91 abuts against a shoulder 99 adjacent the front of the sleeve 106. A pipe or hose 114 is adapted to be screw threaded in the rear of the sleeve 106.

Figure 9:
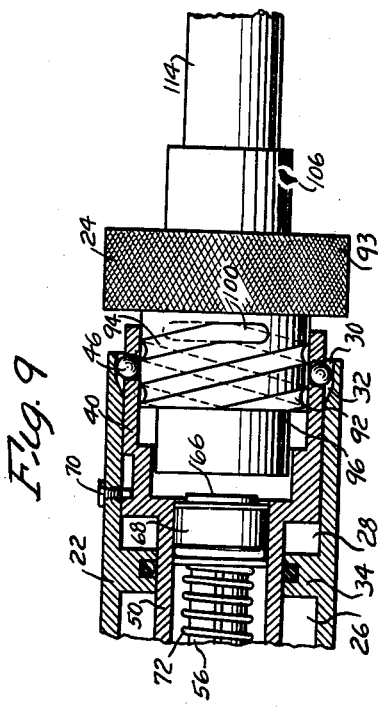
Figure 9 is a cross-sectional view of the coupling, parts in elevation, the two members ready to be separated.

The operation of the coupling is as follows:

The inner end of sleeve 106 and the reduced portion 91 are inserted into the outer end of the bore 44 in sleeve 40 carried in the body 22. The body 24 is turned in a clockwise movement, see Figures 1 and 9 and the leads 96 and 98 of grooves 92 and 94 respectively on the reduced portion 91 will engage the ball bearings 46—46 on the inside of sleeve 40 simultaneously and upon one half revolution of the body 24 the ball bearings 46—46 will be locked respectively in the offsets 100 in the helical grooves 92 and 94 respectively and the two body parts 22 and 24 will be securely fastened together. When the ball bearings 46—46 in sleeve 40 are engaged in the offsets 100—100 of the helical grooves 92 and 94 respectively, the outside of flange 105 has engaged the outer face of the annular ring 68 and has moved the ring 68 rearwardly in the bore 52 of sleeve portion 50 and at the same time the head 66 engages the valve 110 and unseats it from its seat 108. Now with both valves unseated from their valve seats in the coupling members 22 and 24 respectively, intercommunication is established through the two coupling members.

The ball bearings 46—46 will remain in the offsets 100—100 of the helical grooves 92 and 94 respectively and the two coupling members 22 and 24 will be kept coupled together thus maintaining intercommunication through the coupling for the flow of hydraulic fluid such as oil under all ordinary and usual stresses and strains to which the coupling and tubing may be subjected during its use with farm machinery or other mechanism to which it may be applied. If a strain or stress above the predetermined stress should be applied to the coupling 20, it will not break the coupling and tubing connecting the fluid supply tank with the operated mechanism, but the members 22 and 24 will automatically be released from each other. That is, if either the member 22 or member 24 should have a strain above the predetermined strain placed upon it, the reduced portion 91 of member 24 will be moved forward in the bore 28 of the body 22 carrying with it the sleeve 40 of the coupling member 22. As soon as the ball bearings 46—46 in sleeve 40 disengage the surface of bore 28 and engage the tapered surface 32, the sleeve 40 and reduced sleeve 91 will be moved forwardly instantaneously until the ball bearings 46—46 carried by the sleeve 40 engage the bore 30 having a diameter greater than bore 28 in the coupling member 22. When the ball bearings 46—46 carried by the sleeve 40 are in engagement with the surface of bore 32, the grooves 92 and 94 on the reduced portion 91 of the coupling member 24 can be easily disengaged from the ball bearings 46—46 thus permitting the two coupling members 22 and 24 to be separated from each other.

When the two coupling members 22 and 24 are in coupled relationship as shown in Figure 1 of the drawings, the ball bearings 46—46 engage the surface of the bore 28 adjacent the edge of the tapered surface 32 so that if the coupling 20 should have a stress above the predetermined stress placed upon it, the sleeve 40 need move forward only a small distance for the two members to be disengaged from each other.

As long as the coupling 20 is coupled together, the valves in the two members 22 and 24 thereof will remain in open position but if a stress above the predetermined stress should be applied to the coupling members, the reduced portion 91 of the coupling member 24 will move to the right, see Figure 1 of the drawings, thus moving the sleeve 40 forward in the coupling member 22 until the ball bearings 46 engage the surface of bore 30, and then the hydraulic pressure behind the valves 68 and 110 in the members 22 and 24 respectively will instantaneously close said valves.

After the coupling member 24 has been separated from the coupling member 22, coiled spring 90 will return the sleeve 40 rearwardly in body 22 until the ball bearings 46 in sleeve 40 will again engage the surface of bore 28 as shown in Figure 1 of the drawings.

When the coupling member 24 moves the sleeve 40 forwardly in the body 22 under a stress above the predetermined stress so that the two coupling members can be automatically separated from each other under unusual strains or stress prevents damage to the coupling members and the hose line.

The valves in the two coupling members will close immediately upon disconnection of the two coupling members so that no fluid can leak out the ends of the coupling members and no air is permitted to enter the hydraulic line. The fluid pressure in the line, and I contemplate using a thousand pounds' pressure in the line, will instantaneously close the valves in the two coupling members when the two coupling members are separated.

Also a coupling constructed according to my invention will permit the two coupling members to be coupled together at high pressures with relative ease.

The sleeve portion 50 and socket 78 being of substantially the same diameter, the pressure from the oil in the line will be the same on the two members so that the block 60 can be slidably operated in the socket 78 under a zero pressure from the oil in the line.

In Figure 7 is shown a modified form of coupling in which balls 120 and 122 are used as the valve means in the coupling members 22 and 24 respectively. A stub stem 124 prevents the ball 120 being displaced too far from its valve seat, and a coiled spring 126 urges the ball 120 to closed position. When ball bearings are used as valves, they will self lubricate themselves as a little oil will escape on each closure of the ball valves.

It is contemplated that changes in size, dimension and relationship of the elements may be resorted to but all such changes are deemed to fall within the spirit and scope of the appended claims.

I claim as new:

1. A separable fluid coupling device comprising a male coupling member having an axially disposed fluid passage therethrough and having an axially extending end portion formed with a pair of helical grooves having outer lead ends disposed 180° apart, said grooves having a relatively flat pitch throughout their entire lengths and terminating at their inner ends in sockets offset axially from the inner ends of the grooves, said sockets being disposed 180° apart, a female coupling member having an axially disposed bore, said bore having a front end portion terminating in an internal circumferential counterbore, a sleeve slidably disposed in the end portion of the bore and bearing against the wall of the bore, said sleeve receiving the end portion of the male member and having radially extending openings formed through its wall and spaced 180° apart, said openings being of greater diameter at their outer ends than at their inner ends, ball members loosely disposed in the openings and being of a diameter greater than the thickness of the wall of the sleeve and of less diameter than the outer ends of the openings and being partially protruding through the inner ends of the openings and held in engagement with the helical grooves by the wall of the bore, said bore having an internal radially extending rib disposed rearwardly of the sleeve, an axially reduced rearward extension on the sleeve extending axially past the rib and forming a shoulder with the sleeve, said shoulder abutting the rib to locate the sleeve against rearward axial movement in the bore, radially extending outwardly projecting means on the extension, and spring means bearing against said last means and the rib to retain the sleeve in its rearward position against the rib, said sleeve when moved forward under a predetermined strain moving the ball members into registry with the counterbore whereby the ball members are released from engagement with the helical grooves.

2. A separable fluid coupling device as claimed in claim 1, including means carried by the sleeve and the wall of the bore for locating the sleeve and female coupling member against relative rotational movement.

References Cited in the file of this patent

UNITED STATES PATENTS

| Number | Name | Date |
|---|---|---|
| 2,076,411 | Nelson et al. | Apr. 6, 1937 |
| 2,112,108 | Mackenzie | Mar. 22, 1938 |
| 2,135,222 | Scheiwer | Nov. 1, 1938 |
| 2,197,155 | Nardone | Apr. 16, 1940 |
| 2,255,333 | Scheiwer | Sept. 9, 1941 |
| 2,261,505 | Schlesinger | Nov. 4, 1941 |
| 2,307,427 | Smith et al. | Jan. 5, 1943 |
| 2,319,015 | Speth | May 11, 1943 |
| 2,344,739 | Shaff | Mar. 21, 1944 |
| 2,386,270 | Samiran | Oct. 9, 1945 |
| 2,451,218 | Hengst | Oct. 12, 1948 |
| 2,453,741 | Bopp | Nov. 16, 1948 |
| 2,463,326 | Smisko et al. | Mar. 1, 1949 |
| 2,471,237 | Pasturczak | May 24, 1949 |
| 2,509,444 | Mitchell | May 30, 1950 |
| 2,529,821 | Snider | Nov. 14, 1950 |